United States Patent

Glennon

[11] 4,262,242
[45] Apr. 14, 1981

[54] VOLTAGE REGULATOR

[75] Inventor: Timothy F. Glennon, Rockford, Ill.

[73] Assignee: Sundstrand Corporation, Rockford, Ill.

[21] Appl. No.: 72,330

[22] Filed: Sep. 4, 1979

Related U.S. Application Data

[63] Continuation of Ser. No. 873,352, Jan. 30, 1978.

[51] Int. Cl.³ .............................................. H02P 9/14
[52] U.S. Cl. ................................... 322/28; 322/59; 322/90; 307/16
[58] Field of Search ............... 322/7, 20, 25, 28, 59, 322/86, 87, 90; 307/16, 31, 33; 320/15, 17, 64, 68; 219/202, 203, 279

[56] References Cited

U.S. PATENT DOCUMENTS

| | | |
|---|---|---|
| 2,672,585 | 3/1954 | Hotson . |
| 3,267,353 | 8/1966 | Franklin ............................ 322/90 |
| 3,564,391 | 2/1971 | Dinger . |
| 3,571,560 | 3/1971 | Nillsen et al. .................... 219/279 |
| 3,634,750 | 1/1971 | Bobo . |
| 3,745,441 | 7/1973 | Soffer et al. ...................... 322/20 |
| 4,041,363 | 8/1977 | Scheidler ........................ 320/17 X |

Primary Examiner—B. Dobeck
Assistant Examiner—John W. Redman
Attorney, Agent, or Firm—Wegner, Stellman, McCord, Wiles & Wood

[57] ABSTRACT

A voltage regulator for an AC generator which supplies power to multiple loads at different voltage levels. The magnitude of the multiple voltages and other controlled variables such as per unit current are sensed and individual field currents are generated. A single field current is selected from the individual field currents as a function of the magnitude of a selected voltage and the per unit current and applied to the exciter field of the generator for accurate control of the output voltages.

21 Claims, 3 Drawing Figures

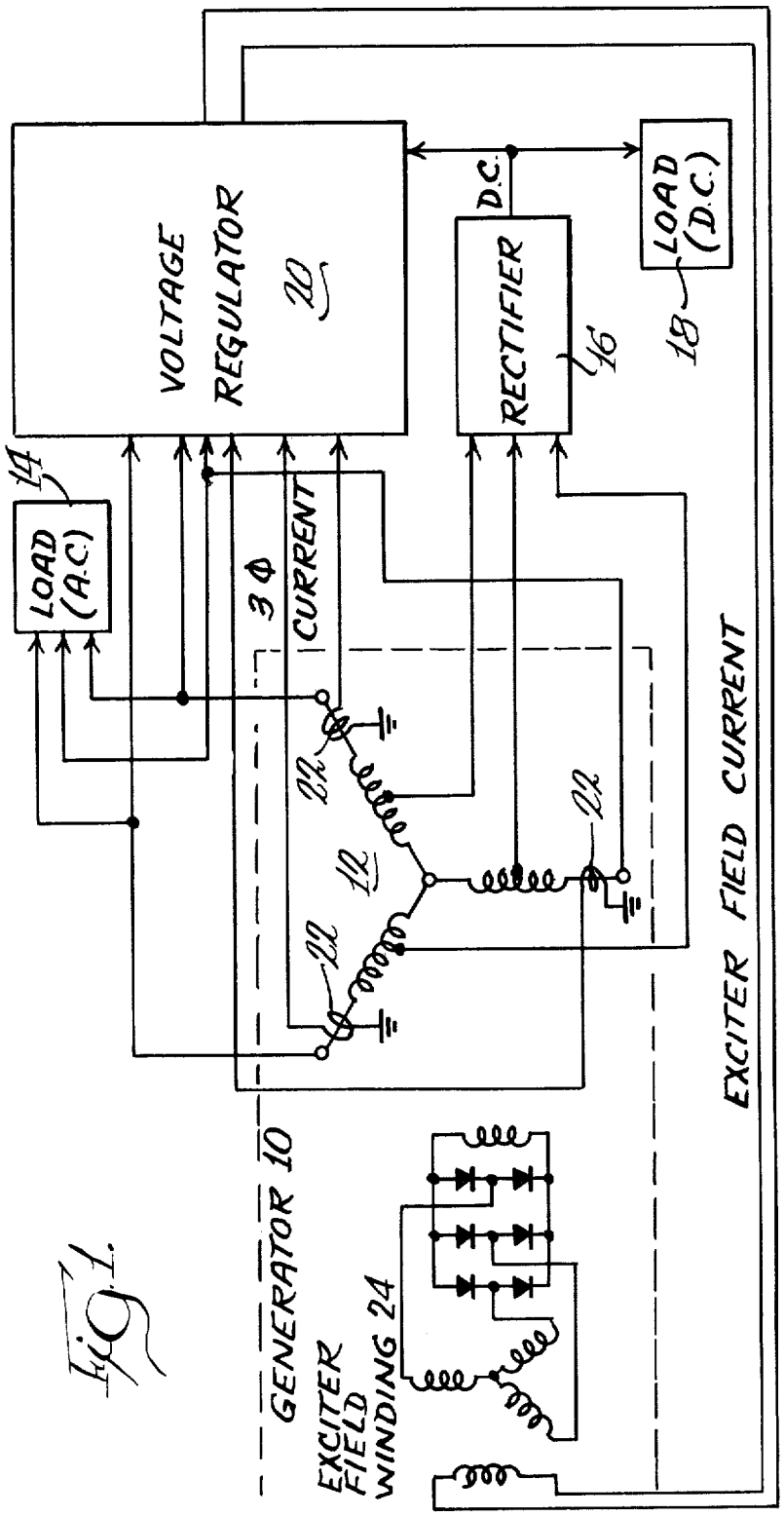
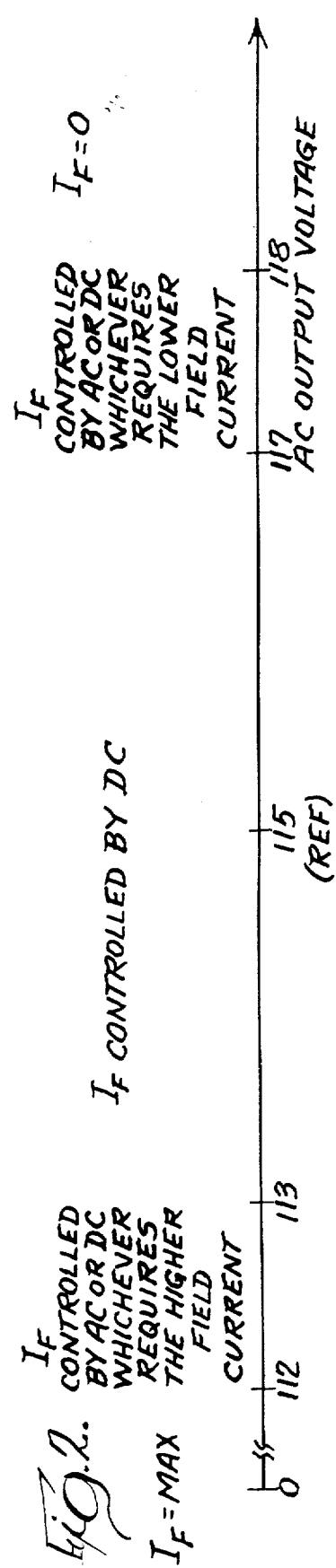
Fig. 1.
Fig. 2.

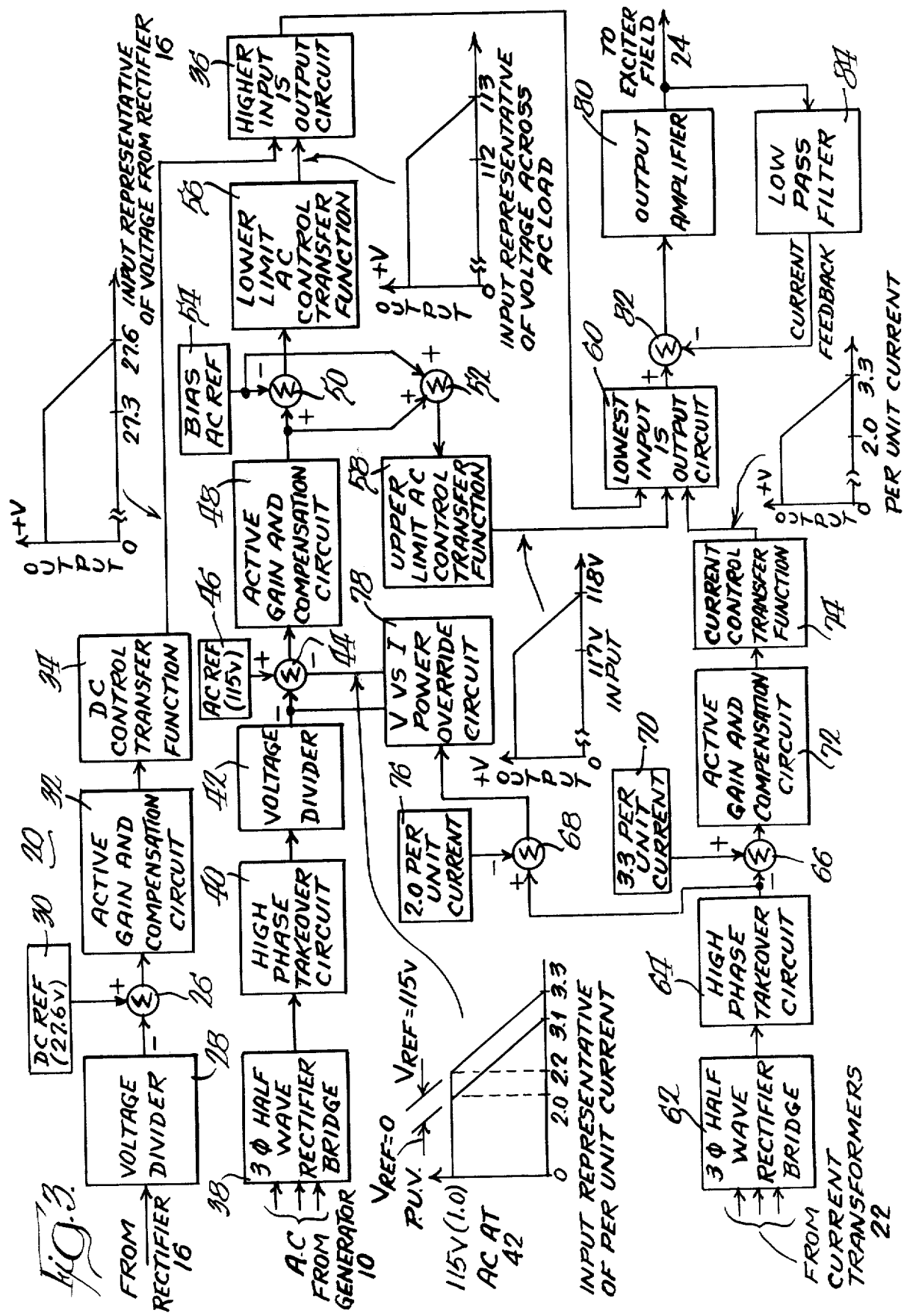

VOLTAGE REGULATOR

This is a continuation, of application Ser. No. 873,352, filed Jan. 30, 1978.

BACKGROUND OF THE INVENTION

This invention relates to voltage regulators for AC generators and, more particularly, to a voltage regulator for an AC generator that provides power to at least two different loads at different voltages.

Voltage regulation of the output power of AC generators is usually effected by controlling the magnitude of the field current to the exciter winding of the generator. If the load on the generator increases, causing a drop in a selected voltage, that condition is detected and the field current is increased, causing the output voltage to return to the selected voltage. Similiarly, if the load on the generator is reduced, causing the voltage to increase above the selected voltage, the magnitude of the field current is reduced, thereby decreasing the output voltage.

If a single AC generator is to provide power to at least two loads at different voltage levels, it becomes necessary to decide which voltage should control the field current. If one voltage suddenly decreases significantly and the field current is increased to drive the decreasing voltage back within its selected range, the voltage to the other load(s) may become undesirably excessive.

Many voltage regulators employ a summing-type control system wherein signals representative of the individual voltages or other control variables are summed to provide a field current representing the average of the individual variables. This type of control system makes independent compensation of the individual voltages difficult and provides a mixed error signal, making effective verification testing difficult.

SUMMARY OF THE INVENTION

In accordance with the present invention, the above drawbacks are overcome by a voltage regulator that provides a field current which is selected from only one input control variable at a time. The selection of the field current from a particular input control variable is dependent upon the value of an AC voltage output and the magnitude of per unit current provided by the generator.

It is a feature of the present invention to provide a voltage regulator which provides the appropriate field current selected from a particular input control variable as a function of the value of the AC voltage and the magnitude of the per unit current.

It is a further feature of the invention to provide a voltage regulator which provides a field current selected so that at any point in time only one of several control loops controls the field current.

DRAWINGS

FIG. 1 is a diagram showing the generator in schematic form and the voltage regulator in accordance with the present invention in block diagram form;

FIG. 2 is a diagram showing the selection of the field current as a function of AC voltage; and FIG. 3 is a detailed block diagram of the voltage regulator of FIG. 1.

DESCRIPTION OF THE PREFERRED EMBODIMENT

Referring to FIG. 1, a generator 10, schematically shown to include main windings 12, provides power at a rated AC voltage to load 14. Windings 12 are tapped at a suitable level to provide power at an AC voltage less than rated to rectifier 16. Rectifier 16 provides a DC voltage to load 18.

Voltage regulator 20 receives voltages representing the control variables including a voltage indicative of the rated AC voltage applied to load 14, a voltage indicative of the DC voltage applied to load 18, and a signal from current transformer 22 representative of the current to load 14. As will be explained in detail below, voltage regulator 20 provides a field current responsive to either the voltage across load 14, the DC voltage across load 18, or the current flow from windings 12 as a function of the magnitude of the AC voltage applied to load 14. The voltage output from generator 10 is proportional to the magnitude of the field current from regulator 20.

The generator 10 and the voltage regulator 20 are contemplated for use in an aircraft wherein the rated AC voltage is intended to be regulated at 115 volts, 400 Hz, and the DC voltage is intended to be regulated to 27.6 volts. Also, the per unit current is not to exceed 3.3 per unit (1.0 per unit current is rated), and the constant power hyperbola (2.2 per unit power) intersects the rated voltage at 2.2 per unit current. The following discussion will be directed primarily to an aircraft system with the above-noted voltage ranges and per unit current limits. However, it is appreciated that other DC voltages, AC voltages and per unit current values could be selected for use with a generator for providing output power at different voltages and currents.

Referring to FIG. 2, and assuming that the per unit current is less than 2.0, the field current, $I_F$, provided to exciter winding 24 of generator 10 is dependent upon the value of the AC voltage across load 14. Specifically, if the voltage applied to load 14 lies between 0 and 112 volts, the field current $I_F$ provided to the exciter winding 24 is at a maximum. If the AC voltage across load 14 is within a range between 113 volts and 117 volts, that is, a mid-range voltage of 115 volts±2 volts, the field current selected and applied to exciter winding 24 is responsive to the magnitude of the DC voltage across load 18. However, if the voltage across load 14 is within a tolerance range between 112 volts and 113 volts, the field current selected applied to exciter winding 24 is responsive to the AC voltage or the DC voltage, whichever requires the higher field current. If the AC voltage across load 14 is within a tolerance range between 117 volts and 118 volts, the field current selected and applied to exciter winding 24 is responsive to either the DC voltage or the AC voltage, whichever requires the lower field current. If the AC voltage exceeds 118 volts, the field current from regulator 20 to exciter winding 24 is zero. In the event that the per unit current is greater than 2.0, the selected field current may be responsive to the per unit current, or the AC voltage as a function of the per unit current, as will be explained in greater detail below.

Referring to FIG. 3, the voltage regulator 20 includes the inputs from rectifier 16, the three-phase input from generator 10 and the three-phase current from transformers 22, and provides an output to exciter winding 24.

The DC voltage from rectifier 16 is applied to a summer 26 through a voltage divider 28. A reference voltage from source 30 is also applied to summer 26. The reference voltage from source 30 represents the selected DC reference voltage as 27.6 volts. The output from summer 26 is an error signal representing the difference, in magnitude and sign, between the voltage from rectifier 16 and the source 30. The output is applied to an active gain and compensation circuit 32 where steady state and transient response charcteristics are controlled.

The signal from the active gain and compensation circuit 32 is applied to DC control transfer function 34 which has an output characteristic similar to that shown in the figure. Specifically, the output voltage from the DC control transfer function 34 is at a maximum selected level +V from 0 volts to 27.3 volts, the reference voltage minus a maximum selected tolerance in which the DC voltage is permitted to vary (27.6−0.3=27.3). The magnitude of the output voltage from the DC control transfer function 34 decreases as a function of an increase in the input representative of the voltage from rectifier 16. The output from DC control transfer function 34 is 0 at the reference voltage. The output of DC control transfer function 34 is applied to the higher input is output circuit 36.

The three-phase AC voltage from generator 10 is applied to a three-phase half-wave rectifier bridge 38 to provide a DC voltage representative of the voltage across load 14. The output from the three-phase half-wave rectifier bridge 38 is applied to a high-phase takeover circuit 40 and a voltage divider 42. The high-phase takeover circuit 40 is arranged so that no phase can exceed a predetermined limit below the minimum over voltage steady state trip level even when the other phases are zero. The high-phase takeover circuit 40 responds to average RMS phase voltage during normal balanced load operation. The output from voltage divider 42 is applied to summer 44 where it is compared to an AC reference voltage (115 volts) from reference source 46. The reference source 46 provides a signal representing the rated voltage. The output from summer 44 is an error voltage which represents the difference, in magnitude and sign, between the voltage from voltage divider 42 and the AC reference voltage from source 46. The output from summer 44 is applied to the active gain and compensation circuit 48 where steady state and transient response characteristics are controlled. The output from active gain and compensation circuit 48 is applied to summers 50 and 52.

A bias AC reference voltage from source 54 is applied to summer 50 at a negative input terminal and to summer 52 at a positive input terminal. The magnitude of the bias AC is the amount in which the AC is permitted to vary from its reference (i.e., 115 volts±2 volts) thereby defining a voltage range. The output from summer 50 is the signal representing the AC voltage across load 14 reduced by the amount established by reference 54 and is applied to lower limit AC control transfer function 56. The output from summer 52 is the signal representing the AC voltage across load 14 increased by the amount established by reference 54, and is applied to upper limit AC control transfer function 58.

The output characteristics of the upper limit AC control transfer function 58 are shown in FIG. 3. As shown, the output is at the preselected level +V when the representative input from summer 52 increases from 0 volts to 117 volts. The output of transfer function 58 decreases linearly to 0 as the representative input voltage increases to 118 volts.

The output characteristics of the lower limit AC control transfer function 56 are shown in the figure. Specifically, the output voltage from lower limit AC control transfer function 56 is at the preselected level +V when the input representative of the voltage across the AC load increases from 0 volts to 112 volts. The output of the transfer function 56 decreases linearly as the voltage increases beyond 112 volts. The output of the transfer function 56 is 0 when the AC voltage input is at its lower limit (113 volts). The output from transfer function 56 is applied to higher input is output circuit 36 where it is compared to the output from DC control transfer function 34.

Higher input is output circuit 36 compares the magnitude of the voltage from DC control transfer function 34 to the magnitude of the voltage from lower limit control transfer function 56 and provides an output signal to lowest input is output circuit 60 equal to the higher one of the two input signals. The high input signal will be that signal which is closer proportionally to +V for its respective range. That is, if the DC voltage is closer proportionally to 27.3 than the AC voltage is to 112 volts, then the output from higher input is output circuit 36 will be responsive to the DC voltage.

The signal representing the current from transformers (with burden resistors) 22 is applied to a three-phase half wave rectifier bridge 62 to provide a voltage representative of the current to load 14. The output from the three-phase half wave rectifier bridge 62 is applied to a high-phase takeover circuit 64. The high-phase takeover circuit 64 senses the highest current in the three phases and applies it to summers 66 and 68.

A signal representing 3.3 per unit current from source 70 is applied to summer 66 where it is compared with the output from high-phase takeover circuit 64. The output from summer 66 is applied to the active gain and compensation circuit 72 for control of the steady state and transient response characteristics. The output from active gain and compensation circuit 72 is applied to the current control transfer function 74. The output characteristics of transfer function 74 are shown in the figure. Specifically, the output voltage from the current control transfer function 74 is at the selected level +V from 0 to 2.0 per unit current. The output of transfer function 74 decreases linearly from +V to 0 as the per unit current increases from 2.0 to a maximum permitted per unit current as 3.3 per unit. The output from the current control transfer function 74 is applied to lowest input is output circuit 60. If the current sensed by transformers 22 increases past twice the rated current, the output from current control transfer function 74 decreases. The purpose of the decreasing output will be explained below.

A signal representing 2.0 per unit current from source 76 is applied to summer 68 where it is compared to the output from the high-phase takeover circuit 64. The output from the summer 68 represents the difference between the current from the high-phase takeover circuit 64 and the signal from source 76. The output from summer 68 is applied to the V vs. I power override circuit 78 along with the AC voltage from 42. The output from the V vs. I override circuit 78 is applied to summer 44. The output characteristics of the V vs. I power override circuit 78 are shown in the figure. The output is zero between 0 to 2.0 per unit current at 1.0 per unit voltage and increases linearly to 115 volts as the per unit current increases from 2.0 to 2.2 at 1.0 per unit rated voltage. Similarly, the output is zero between 0 to 3.1 per unit current at 0.0 per unit voltage and increases linearly to 115 volts as per unit current increases from 3.1 to 3.3 at 0.0 per unit voltage. Therefore, it is apparent that the output is a function of the per unit current and falls within a band defined by 3.1 and 3.3. at 0 per unit voltage and 2.0 and 2.2. at 1.0 per unit voltage. Although various per unit current values can be selected, 2.0 per unit current corresponds to the guaranteed performance specifications of the system, 2.2. per unit current corresponds to the maximum protective torque limit, 3.3 per unit current corresponds to the maximum permissible feeder current, and 3.1 corresponds to a selected value to define the fourth corner of the band. The output from the override circuit 78 provides a signal which increases as the voltage and current approach a constant power hyperbola for the system at 2.2 per unit power equal to 115 volts.

The output from the power override circuit biases the signal representing the AC voltage across load 14 from voltage divider 42 downwardly, causing the outputs from the lower limit AC transfer function 56 and the upper limit AC control transfer function 58 to provide outputs modified by the current as described.

The outputs from the higher input is output circuit 36, the upper limit AC control transfer function 58 and the current control transfer function 74 are applied to lowest input is output circuit 60. The output from the lowest input is output circuit 60 is equal to the lowest input and is applied to output amplifier 80 through summer 82. The output of amplifier 80 is the field current which is applied to exciter field 24. The output from amplifier 80 is also applied to low pass filter 84 for providing an average field current feedback to the negative terminal of summer 82 to ensure current stability over a wide range of thermal conditions.

The field current amplifier may be pulse width modulated and synchronized to the generator 10 in any acceptable manner including synchronization to the 1200 Hz ripple frequency. Alternatively, the field current amplifier can be synchronized to the generator 10 by use of a PMG.

I claim:

1. A voltage regulator for providing a field current to a generator supplying power to at least a first and second load comprising:
   means for detecting the voltage across the first load;
   means for concurrently detecting the voltage across the second load;
   means for establishing a voltage range for said voltage across the first load;
   determining means for determining if said voltage across said first load is within said first range;
   means for generating a field current representative of the concurrently detected voltage across the second load; and
   means for providing the field current to said generator as an incident of said determining means determining that said voltage across the first load is within said voltage range.

2. The voltage regulator of claim 1 wherein said voltage range establishing means comprises means for establishing a voltage range extending from approximately 113 volts to 117 volts.

3. The voltage regulator of claim 1 further including means for establishing a second voltage range for said voltage across said first load, said determining means further defining means for determining if said voltage across said first load is within said second range, said voltage regulator further including means for generating a field current representative of the voltage across the load requiring the highest field current, and means for providing the field current to said generator if said voltage across the first load is within said second voltage range.

4. The voltage regulator of claim 3 wherein said second voltage range establishing means comprises means for establishing a voltage range extending from approximately 112 volts to 113 volts.

5. The voltage regulator of claim 1 further including means for establishing a second voltage range for said voltage across said first load, said determining means further defining means for determining if said voltage across said load is within said second range, said voltage regulator further including means for generating a field current representative of the voltage across the load requiring the lowest field current, and means for providing the field current to said generator if said voltage across the first load is within said second voltage range.

6. The voltage regulator of claim 5 wherein said second voltage range establishing means comprises means for establishing a voltage range extending from approximately 117 volts to 118 volts.

7. The voltage regulator of claim 1 further including means for preventing provision of field current to said operation in the event the voltage across said first load is above a preselected high voltage.

8. The voltage regulator of claim 1 wherein at least one of the loads is an AC load and at least one of the loads is a DC load.

9. A voltage regulator for providing a field current to a generator supplying power to at least a first and a second load comprising:
   means for detecting the voltage across the first load;
   means for detecting the voltage across the second load;
   means for establishing a first voltage range for said voltage across the first load;
   means for establishing a second voltage range for said voltage across the second load;
   means for determining if said first voltage is within said first range and for generating a first field current representative of the voltage across the first load;
   means for determining if said voltage across the second load is within said second voltage range and for generating a second field current representative of the voltage across the second load; and
   means for providing the second field current to said generator if said voltage across the first load is within said first voltage range.

10. The voltage regulator of claim 9 wherein said first voltage range is from approximately 112 volts AC to 117 volts AC and said second range is from approximately 27.3 volts DC to 27.6 volts DC.

11. The voltage regulator of claim 9 further including:
   means for establishing a first and a second tolerance voltage range adjacent said first voltage range;
   means for determining if said first voltage is within said first and second tolerance voltage ranges; and
   means for providing the higher of the first and second field currents to said generator if said voltage across said first load is within said first tolerance range and for providing the lower of the first and second field currents to said generator if said voltage across said first load is within said second tolerance range.

12. The voltage regulator of claim 11 wherein said first tolerance voltage range is approximately 112 to 113 volts AC and said second tolerance voltage range is from approximately 117 to 118 volts AC.

13. The voltage regulator of claim 9 wherein said means for providing said second field current to said generator if the voltage across the first load is within the first range provides said first field current to said generator if said first voltage is outside said first voltage range.

14. The voltage regulator of claim 9 further including:
    means for detecting the current component of power applied to said first load;
    means for establishing a current range for said current;
    means for determining if said current is greater than said current range and for generating a third field current representative of the magnitude of the current; and
    means for providing said third field current to said generator if said current is greater than said current range.

15. A voltage regulator for a generator supplying power to at least a first and a second load at different voltages comprising:
    means for detecting the current provided to said first load;
    means for detecting the voltage across the first load;
    means for detecting the voltage across the second load;
    means for establishing a range for said current;
    means for establishing a range for said voltage across said first load;
    means for establishing a range for said voltage across said second load;
    means for determining if said current is greater than said range for said current and for generating a field current representative of the current if said current exceeds said range;
    means for determining if said first voltage is within said range for said voltage across said first load and for generating a field current representative of the voltage across the first load;
    means for determining if said second voltage is within said range for said voltage across said second load and for generating a field current representative of said voltage across said second load; and
    means for selecting between said field current representative of the voltage across the first load and field current representative of the voltage across the second load if said current is not greater than said range for said current and for selecting said field current representative of the current if said current is greater than said range for said current.

16. The voltage regulator of claim 15 further including means for selecting said field current representative of said voltage across the second load if the voltage across the first load is within said range for said voltage across the first load and said current is not greater than said range for said current.

17. The voltage regulator of claim 16 further including:
    means for determining per unit current as a function of the voltage across the first load; and
    means for inhibiting said first and second field currents from being applied to said generator if said per unit current is greater than a selected value for a selected voltage across the first load.

18. In a generator for providing an AC voltage to a first load and a DC voltage to a second load, an improved voltage regulator comprising:
    means for establishing a reference voltage of said DC voltage;
    means for comparing said reference voltage to said DC voltage to provide a first error signal;
    means responsive to said first error signal for providing an output at a selected level when said DC voltage is at least a preselected voltage less than said DC reference voltage and for providing an output less than said selected level as said DC voltage increases therefrom to said DC reference voltage;
    means for establishing a reference voltage for said AC voltage;
    means for comparing said AC reference voltage with the AC voltage to said first load for providing a second error signal;
    means for establishing a lower and an upper limit for said AC voltage, thereby defining a range for said AC voltage;
    means responsive to said second error signal for providing an output at said selected level when said AC voltage is less than said lower limit and for decreasing the output from said selected level as said AC voltage increases beyond said lower limit;
    means for comparing said output representing the DC voltage to said output representing the AC voltage at said lower limit for providing an output equal to the higher of the two outputs;
    means for providing an output at said selected level when said AC voltage is less than said upper limit and for decreasing the output when said AC voltage increases beyond said upper limit; and
    means for comparing said higher of the two outputs to said output representing the AC voltage at said upper limit and for providing a field current equal to the lower of the two.

19. The generator of claim 18 further including:
    means for measuring the current applied to the first load;
    means for establishing a reference current;
    means for comparing said reference current to the current applied to said first load to provide a third error signal;
    means responsive to said third error signal for providing an output at said selected level when said current is less than said reference current and for providing an output less than said selected level when said current increases beyond said reference current; and
    means for comparing the output representing the current to said field current and providing a field current to said generator equal to the lower.

20. A method of controlling the voltages from a generator providing power to at least two loads at different voltages in response to a field current applied to the generator comprising:
    sensing the voltage across a first load;
    sensing the voltage across a second load;
    establishing a first range for said first voltage;
    establishing a second range for said second voltage;

generating a first field current representing the first voltage;

generating a second field current representing the second voltage;

selecting said second field current as the field current to be applied to the generator if said first voltage is within the first range; and selecting said first field current as the field current to be applied to the generator if said first voltage is not within said first range.

21. The method of claim 20 further including:

sensing the current component of the power to the first load;

establishing a range for said current;

generating a third field current representing said current; and selecting said third field current for the field current to be applied to said generator if said current is greater than said range for said current and for selecting either said first field current or said second field current if said current is not greater than said range for said current.

* * * * *